US009350776B2

(12) United States Patent
Koehler et al.

(10) Patent No.: US 9,350,776 B2
(45) Date of Patent: *May 24, 2016

(54) SYSTEM AND METHOD FOR LISTENING TO TEAMS IN A RACE EVENT

(71) Applicant: TAGI Ventures, LLC, Orono, MN (US)

(72) Inventors: Steven M. Koehler, Orono, MN (US); Eric K. Moe, West Malling (GB)

(73) Assignee: TAGI Ventures, LLC, Orono, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,691

(22) Filed: Jun. 15, 2015

(65) Prior Publication Data
US 2015/0304739 A1 Oct. 22, 2015

Related U.S. Application Data

(63) Continuation of application No. 13/400,245, filed on Feb. 20, 2012, now Pat. No. 9,059,809, which is a continuation of application No. 11/620,967, filed on Jan. 8, 2007, now Pat. No. 8,127,037, which is a continuation of application No. 10/060,800, filed on Jan. 30, 2002, now Pat. No. 7,162,532, which is a continuation-in-part of application No. 09/128,896, filed on Aug. 4, 1998, now abandoned.

(60) Provisional application No. 60/075,659, filed on Feb. 23, 1998.

(51) Int. Cl.
H04M 3/56 (2006.01)
H04L 29/06 (2006.01)
H04N 21/218 (2011.01)
H04N 21/81 (2011.01)
(Continued)

(52) U.S. Cl.
CPC ........... *H04L 65/4038* (2013.01); *H04H 20/04* (2013.01); *H04L 12/1822* (2013.01); *H04L 65/608* (2013.01); *H04L 67/1095* (2013.01); *H04M 3/56* (2013.01); *H04M 3/566* (2013.01); *H04N 21/2187* (2013.01); *H04N 21/21805* (2013.01); *H04N 21/233* (2013.01); *H04N 21/439* (2013.01); *H04N 21/4854* (2013.01); *H04N 21/8106* (2013.01)

(58) Field of Classification Search
CPC ..... H04L 65/4038; H04M 3/56; H04M 3/566
See application file for complete search history.

(56) References Cited

U.S. PATENT DOCUMENTS 4,059,735 A 11/1977 Betts
4,139,860 A 2/1979 Micic et al.
(Continued)

FOREIGN PATENT DOCUMENTS

AU 779175 B2 1/2005
CA 2237939 A1 8/1998
(Continued)

OTHER PUBLICATIONS

"In-Car Audio", 1999 ESPN Network.
(Continued)

Primary Examiner — Aaron Strange
(74) Attorney, Agent, or Firm — Steven M. Koehler; Westman, Champlin & Koehler, P.A.

(57) ABSTRACT

A computer-implemented method and system allows a remote computer user to listen to teams in a race event. The method includes receiving audio signals from a plurality of audio sources at the race event; transmitting at least some of the audio signals to a remote computer; and filtering the audio signals as a function of the source of at least some of the audio signals so that at least some of the audio signals are not played by the remote computer and heard by the user.

20 Claims, 5 Drawing Sheets

(51) Int. Cl.
*H04L 12/18* (2006.01)
*H04H 20/04* (2008.01)
*H04N 21/2187* (2011.01)
*H04L 29/08* (2006.01)
*H04N 21/233* (2011.01)
*H04N 21/439* (2011.01)
*H04N 21/485* (2011.01)

(56) References Cited

U.S. PATENT DOCUMENTS

| | | |
|---|---|---|
| 4,259,690 A | 3/1981 | Nakanishi et al. |
| 4,449,114 A | 5/1984 | Fascenda et al. |
| 4,853,764 A | 8/1989 | Sutter |
| 4,866,515 A | 9/1989 | Tagawa et al. |
| 4,887,152 A | 12/1989 | Matsuzaki et al. |
| 5,003,300 A | 3/1991 | Wells |
| 5,012,350 A | 4/1991 | Streck et al. |
| 5,023,706 A | 6/1991 | Sandberg |
| 5,045,948 A | 9/1991 | Streck et al. |
| 5,047,860 A | 9/1991 | Rogalski |
| 5,068,733 A | 11/1991 | Bennett |
| 5,161,250 A | 11/1992 | Ianna et al. |
| 5,189,562 A | 2/1993 | Greene |
| 5,189,630 A | 2/1993 | Barstow et al. |
| 5,289,272 A | 2/1994 | Rabowsky et al. |
| 5,434,590 A | 7/1995 | Dinwiddie, Jr. et al. |
| 5,485,504 A | 1/1996 | Ohnsorge |
| 5,491,743 A | 2/1996 | Shiio et al. |
| 5,504,535 A | 4/1996 | Abe |
| 5,508,707 A | 4/1996 | LeBlanc et al. |
| 5,510,828 A | 4/1996 | Lutterbach et al. |
| 5,513,384 A | 4/1996 | Brennan et al. |
| 5,534,912 A | 7/1996 | Kostreski |
| 5,539,465 A | 7/1996 | Xu et al. |
| 5,563,931 A | 10/1996 | Bishop et al. |
| 5,564,977 A | 10/1996 | Algie |
| 5,570,412 A | 10/1996 | LeBlanc |
| 5,574,964 A | 11/1996 | Hamlin |
| 5,596,625 A | 1/1997 | LeBlanc |
| 5,598,208 A | 1/1997 | McClintock |
| 5,600,365 A | 2/1997 | Kondo et al. |
| 5,600,368 A | 2/1997 | Matthews |
| 5,617,331 A | 4/1997 | Wakai et al. |
| 5,621,456 A | 4/1997 | Florin et al. |
| 5,663,717 A | 9/1997 | Deluca |
| 5,666,101 A | 9/1997 | Caszani et al. |
| 5,666,151 A | 9/1997 | Kondo et al. |
| 5,696,706 A | 12/1997 | Morton et al. |
| 5,703,794 A * | 12/1997 | Heddle ............. H04H 60/04 370/267 |
| 5,708,961 A | 1/1998 | Hylton et al. |
| 5,717,869 A * | 2/1998 | Moran ............... G06Q 10/10 707/999.002 |
| 5,720,037 A | 2/1998 | Biliris et al. |
| 5,729,471 A | 3/1998 | Jain et al. |
| 5,768,527 A | 6/1998 | Zhu et al. |
| 5,774,016 A * | 6/1998 | Ketterer ............. H04S 3/006 330/124 R |
| 5,793,413 A | 8/1998 | Hylton et al. |
| 5,812,937 A | 9/1998 | Takahisa et al. |
| 5,815,216 A | 9/1998 | Suh |
| 5,822,527 A | 10/1998 | Post |
| 5,847,771 A | 12/1998 | Cloutier et al. |
| 5,894,320 A | 4/1999 | Vancelette |
| 5,907,322 A | 5/1999 | Kelly et al. |
| 5,912,644 A | 6/1999 | Wang |
| 5,915,020 A | 6/1999 | Tilford et al. |
| 5,921,780 A | 7/1999 | Myers |
| 5,946,635 A | 8/1999 | Dominguez |
| 5,991,385 A | 11/1999 | Dunn et al. |
| 5,999,808 A | 12/1999 | LaDue |
| 6,009,336 A | 12/1999 | Harris et al. |
| 6,020,851 A * | 2/2000 | Busack ............. G01S 5/0027 340/323 R |
| 6,029,195 A | 2/2000 | Herz |
| 6,044,403 A | 3/2000 | Gerszberg et al. |
| 6,055,419 A | 4/2000 | Beard |
| 6,075,527 A | 6/2000 | Ichihashi et al. |
| 6,078,594 A | 6/2000 | Anderson et al. |
| 6,078,874 A | 6/2000 | Piety et al. |
| 6,078,954 A | 6/2000 | Lakey et al. |
| 6,080,063 A | 6/2000 | Khosla |
| 6,093,880 A | 7/2000 | Arnalds |
| 6,097,441 A | 8/2000 | Allport |
| 6,100,925 A | 8/2000 | Rosser et al. |
| 6,106,399 A | 8/2000 | Baker et al. |
| 6,124,862 A | 9/2000 | Boyken et al. |
| 6,125,259 A | 9/2000 | Perlman |
| 6,137,525 A | 10/2000 | Lee et al. |
| 6,144,375 A | 11/2000 | Jain et al. |
| 6,163,338 A | 12/2000 | Johnson et al. |
| 6,182,084 B1 | 1/2001 | Cockrell et al. |
| 6,192,257 B1 | 2/2001 | Ray |
| 6,195,090 B1 | 2/2001 | Riggins, III |
| 6,236,365 B1 | 5/2001 | LeBlanc et al. |
| 6,271,752 B1 | 8/2001 | Vaios |
| 6,292,828 B1 | 9/2001 | Williams |
| 6,301,514 B1 | 10/2001 | Canada et al. |
| 6,332,024 B1 | 12/2001 | Inoue et al. |
| 6,396,509 B1 | 5/2002 | Cheng |
| 6,400,264 B1 | 6/2002 | Hsieh |
| 6,415,289 B1 | 7/2002 | Williams et al. |
| 6,424,369 B1 | 7/2002 | Adair et al. |
| 6,434,403 B1 | 8/2002 | Ausems et al. |
| 6,434,530 B1 | 8/2002 | Sloane et al. |
| 6,509,908 B1 | 1/2003 | Croy et al. |
| 6,516,466 B1 | 2/2003 | Jackson |
| 6,522,352 B1 | 2/2003 | Strandwitz et al. |
| 6,525,762 B1 | 2/2003 | Mileski et al. |
| 6,526,335 B1 | 2/2003 | Treyz et al. |
| 6,526,575 B1 | 2/2003 | McCoy et al. |
| 6,535,493 B1 | 3/2003 | Lee et al. |
| 6,544,121 B2 | 4/2003 | DeWeese et al. |
| 6,564,070 B1 | 5/2003 | Nagamine et al. |
| 6,570,889 B1 | 5/2003 | Stirling-Gallacher et al. |
| 6,571,279 B1 | 5/2003 | Herz et al. |
| 6,578,203 B1 | 6/2003 | Anderson, Jr. et al. |
| 6,624,846 B1 | 9/2003 | Lassiter |
| 6,631,522 B1 * | 10/2003 | Erdelyi ............. G06F 17/30793 348/E7.061 |
| 6,651,253 B2 | 11/2003 | Dudkiewicz et al. |
| 6,657,654 B2 | 12/2003 | Narayanaswami |
| 6,669,346 B2 | 12/2003 | Metcalf |
| 6,675,386 B1 | 1/2004 | Hendricks et al. |
| 6,681,398 B1 | 1/2004 | Verna |
| 6,697,103 B1 | 2/2004 | Fernandez et al. |
| 6,725,303 B1 | 4/2004 | Hoguta et al. |
| 6,728,784 B1 | 4/2004 | Mattaway |
| 6,741,856 B2 | 5/2004 | McKenna et al. |
| 6,760,595 B2 | 7/2004 | Inselberg |
| 6,782,102 B2 | 8/2004 | Blanchard et al. |
| 6,807,367 B1 | 10/2004 | Durlach |
| 6,813,608 B1 | 11/2004 | Baranowski |
| 6,825,875 B1 | 11/2004 | Strub et al. |
| 6,831,907 B2 | 12/2004 | Dolman et al. |
| 6,907,023 B2 | 6/2005 | McKenna et al. |
| 6,952,181 B2 | 10/2005 | Karr et al. |
| 6,952,558 B2 | 10/2005 | Hardacker |
| 6,961,586 B2 | 11/2005 | Barbosa et al. |
| 6,965,937 B2 | 11/2005 | Gaddis et al. |
| 6,973,665 B2 | 12/2005 | Dudkiewicz et al. |
| 6,996,413 B2 | 2/2006 | Inselberg |
| 7,013,110 B1 | 3/2006 | Carpenter et al. |
| 7,035,804 B2 | 4/2006 | Saindon et al. |
| 7,069,573 B1 | 6/2006 | Brooks et al. |
| 7,079,176 B1 | 7/2006 | Freeman et al. |
| 7,124,425 B1 | 10/2006 | Anderson, Jr. et al. |
| 7,133,837 B1 | 11/2006 | Barnes, Jr. |
| 7,149,549 B1 | 12/2006 | Ortiz et al. |
| 7,155,199 B2 | 12/2006 | Zalewski et al. |
| 7,162,532 B2 | 1/2007 | Koehler et al. |
| 7,194,395 B2 | 3/2007 | Genovese |
| 7,194,687 B2 | 3/2007 | Sezan et al. |

(56) References Cited

U.S. PATENT DOCUMENTS

| | | | |
|---|---|---|---|
| 7,209,733 B2 | 4/2007 | Ortiz et al. |
| 7,210,160 B2 | 4/2007 | Anderson, Jr. et al. |
| 7,248,888 B2 | 7/2007 | Inselberg |
| 7,263,378 B2 | 8/2007 | Inselberg |
| 7,289,793 B2 | 10/2007 | Norwood et al. |
| 7,305,691 B2 | 12/2007 | Cristofalo |
| 7,337,462 B2 | 2/2008 | Dudkiewicz et al. |
| 7,367,043 B2 | 4/2008 | Dudkiewicz et al. |
| 7,376,388 B2 | 5/2008 | Ortiz et al. |
| 7,386,870 B2 | 6/2008 | Lu |
| 7,434,247 B2 | 10/2008 | Dudkiewicz et al. |
| 7,444,660 B2 | 10/2008 | Dudkiewicz |
| 7,451,401 B2 | 11/2008 | Tanskanen et al. |
| 7,483,049 B2 | 1/2009 | Aman et al. |
| 7,487,112 B2 | 2/2009 | Barnes, Jr. |
| 7,493,368 B2 | 2/2009 | Raverdy et al. |
| 7,611,409 B2 | 11/2009 | Muir et al. |
| 7,617,272 B2 | 11/2009 | Bulson et al. |
| 7,657,920 B2 | 2/2010 | Arseneau |
| 7,792,539 B2 | 9/2010 | Inselberg |
| 8,701,147 B2 | 4/2014 | Thomas et al. |
| 2001/0003715 A1 | 6/2001 | Jutzi et al. |
| 2001/0010541 A1 | 8/2001 | Fernandez et al. |
| 2001/0022615 A1 | 9/2001 | Fernandez et al. |
| 2001/0029613 A1 | 10/2001 | Fernandez et al. |
| 2002/0028690 A1 | 3/2002 | McKenna et al. |
| 2002/0040475 A1 | 4/2002 | Yap et al. |
| 2002/0042743 A1 | 4/2002 | Ortiz et al. |
| 2002/0042918 A1 | 4/2002 | Townsend et al. |
| 2002/0057340 A1 | 5/2002 | Fernandez et al. |
| 2002/0057364 A1 | 5/2002 | Anderson et al. |
| 2002/0058499 A1 | 5/2002 | Ortiz |
| 2002/0063697 A1 | 5/2002 | Amano |
| 2002/0063799 A1 | 5/2002 | Ortiz et al. |
| 2002/0065074 A1 | 5/2002 | Cohn et al. |
| 2002/0069243 A1 | 6/2002 | Raverdy et al. |
| 2002/0069419 A1 | 6/2002 | Raverdy et al. |
| 2002/0073421 A1 | 6/2002 | Levitan et al. |
| 2002/0077974 A1 | 6/2002 | Ortiz |
| 2002/0083468 A1 | 6/2002 | Dudkiewicz |
| 2002/0087979 A1 | 7/2002 | Dudkiewicz et al. |
| 2002/0087987 A1 | 7/2002 | Dudkiewicz et al. |
| 2002/0092019 A1 | 7/2002 | Marcus |
| 2002/0095357 A1 | 7/2002 | Hunter et al. |
| 2002/0108125 A1 | 8/2002 | Joao |
| 2002/0124249 A1 | 9/2002 | Shintani et al. |
| 2002/0133247 A1 | 9/2002 | Smith et al. |
| 2002/0138587 A1 | 9/2002 | Koehler et al. |
| 2002/0152462 A1 | 10/2002 | Hoch et al. |
| 2002/0152476 A1 | 10/2002 | Anderson et al. |
| 2002/0161579 A1 | 10/2002 | Saindon et al. |
| 2002/0166119 A1 | 11/2002 | Cristofalo |
| 2002/0167442 A1 | 11/2002 | Taylor |
| 2002/0174430 A1 | 11/2002 | Ellis et al. |
| 2002/0184641 A1 | 12/2002 | Johnson et al. |
| 2002/0188943 A1 | 12/2002 | Freeman et al. |
| 2002/0194589 A1 | 12/2002 | Cristofalo et al. |
| 2002/0194601 A1 | 12/2002 | Perkes et al. |
| 2002/0199198 A1 | 12/2002 | Stonedahl |
| 2003/0005455 A1 | 1/2003 | Bowers |
| 2003/0007464 A1 | 1/2003 | Balani |
| 2003/0014412 A1 | 1/2003 | Collart |
| 2003/0017826 A1 | 1/2003 | Fishman et al. |
| 2003/0043769 A1 | 3/2003 | Dolman et al. |
| 2003/0051253 A1 | 3/2003 | Barone |
| 2003/0065805 A1 | 4/2003 | Barnes |
| 2003/0069762 A1 | 4/2003 | Gathman et al. |
| 2003/0069829 A1 | 4/2003 | Gathman et al. |
| 2003/0070182 A1 | 4/2003 | Pierre et al. |
| 2003/0088873 A1 | 5/2003 | McCoy et al. |
| 2003/0093790 A1 | 5/2003 | Logan et al. |
| 2003/0093794 A1 | 5/2003 | Thomas et al. |
| 2003/0100326 A1 | 5/2003 | Grube et al. |
| 2003/0105558 A1 | 6/2003 | Steele |
| 2003/0110503 A1 | 6/2003 | Perkes |
| 2003/0112354 A1 | 6/2003 | Ortiz et al. |
| 2003/0144054 A1 | 7/2003 | DeWeese et al. |
| 2003/0149988 A1 | 8/2003 | Ellis et al. |
| 2003/0222819 A1 | 12/2003 | Karr et al. |
| 2004/0006774 A1 | 1/2004 | Anderson et al. |
| 2004/0024812 A1 | 2/2004 | Park et al. |
| 2004/0032495 A1 | 2/2004 | Ortiz |
| 2004/0073927 A1 | 4/2004 | Knudson et al. |
| 2004/0133467 A1 | 7/2004 | Siler |
| 2004/0145459 A1 | 7/2004 | Himmelstein |
| 2004/0171381 A1 | 9/2004 | Inselberg |
| 2004/0185856 A1 | 9/2004 | McKenna et al. |
| 2004/0192329 A1 | 9/2004 | Barbosa et al. |
| 2004/0193499 A1 | 9/2004 | Ortiz et al. |
| 2004/0196181 A1 | 10/2004 | Huston et al. |
| 2004/0229568 A1 | 11/2004 | Lowe et al. |
| 2004/0229671 A1 | 11/2004 | Stronach et al. |
| 2004/0261127 A1 | 12/2004 | Freeman et al. |
| 2005/0021364 A1 | 1/2005 | Nakfoor |
| 2005/0021365 A1 | 1/2005 | Nakfoor |
| 2005/0021467 A1 | 1/2005 | Franzdonk |
| 2005/0033506 A1 | 2/2005 | Peterson |
| 2005/0050575 A1 | 3/2005 | Arseneau |
| 2005/0201302 A1 | 9/2005 | Gaddis et al. |
| 2005/0203927 A1 | 9/2005 | Sull et al. |
| 2005/0251827 A1 | 11/2005 | Ellis et al. |
| 2005/0275626 A1 | 12/2005 | Mueller et al. |
| 2006/0015904 A1 | 1/2006 | Marcus |
| 2006/0025158 A1 | 2/2006 | LeBlanc et al. |
| 2006/0064716 A1 | 3/2006 | Sull et al. |
| 2006/0069749 A1 | 3/2006 | Herz et al. |
| 2006/0094409 A1 | 5/2006 | Inselberg |
| 2006/0117371 A1 | 6/2006 | Margulis |
| 2006/0149633 A1 | 7/2006 | Voisin et al. |
| 2006/0154657 A1 | 7/2006 | Inselberg |
| 2006/0156219 A1 | 7/2006 | Haot et al. |
| 2006/0174297 A1 | 8/2006 | Anderson, Jr. |
| 2006/0179462 A1 | 8/2006 | Willame et al. |
| 2006/0184431 A1 | 8/2006 | Rosenberg et al. |
| 2006/0190250 A1 | 8/2006 | Saindon et al. |
| 2006/0242680 A1 | 10/2006 | Johnson et al. |
| 2006/0244839 A1 | 11/2006 | Glatron et al. |
| 2006/0252526 A1 | 11/2006 | Walker et al. |
| 2006/0253330 A1 | 11/2006 | Maggio et al. |
| 2006/0253542 A1 | 11/2006 | McCausland et al. |
| 2006/0282319 A1 | 12/2006 | Maggio |
| 2006/0288375 A1 | 12/2006 | Ortiz et al. |
| 2007/0018952 A1 | 1/2007 | Arseneau et al. |
| 2007/0061845 A1 | 3/2007 | Barnes |
| 2007/0094698 A1 | 4/2007 | Bountour et al. |
| 2007/0095887 A1 | 5/2007 | Barbosa et al. |
| 2007/0197247 A1 | 8/2007 | Inselberg |
| 2007/0202900 A1 | 8/2007 | Inselberg |
| 2008/0016534 A1 | 1/2008 | Ortiz et al. |
| 2008/0065768 A1 | 3/2008 | Ortiz et al. |
| 2008/0270579 A1 | 10/2008 | Herz et al. |
| 2009/0009605 A1 | 1/2009 | Ortiz |
| 2009/0046152 A1 | 2/2009 | Aman |
| 2009/0144624 A1 | 6/2009 | Barnes, Jr. |

FOREIGN PATENT DOCUMENTS

| | | |
|---|---|---|
| CA | 2369832 A1 | 9/2000 |
| CA | 2348353 | 5/2001 |
| CA | 2361659 A1 | 5/2003 |
| EP | 0578201 A2 | 1/1994 |
| EP | 1166596 | 1/2002 |
| GB | 2355135 A | 4/2001 |
| WO | 9303571 A1 | 2/1993 |
| WO | 9411855 A1 | 5/1994 |
| WO | WO97/08896 | 3/1997 |
| WO | 9831148 A1 | 7/1998 |
| WO | WO9841020 | 9/1998 |
| WO | 9939299 A2 | 8/1999 |
| WO | 0054554 A1 | 9/2000 |
| WO | WO0108417 | 2/2001 |
| WO | 0120572 A1 | 3/2001 |
| WO | 02096097 A1 | 11/2002 |
| WO | 02096104 A2 | 11/2002 |

(56) References Cited

FOREIGN PATENT DOCUMENTS

| WO | 03042939 A2 | 5/2003 |
| WO | 2004034617 A1 | 4/2004 |
| WO | 2004040886 A1 | 5/2004 |
| WO | 2005011254 A2 | 2/2005 |
| WO | 2005076625 A1 | 8/2005 |
| WO | 2006067545 A1 | 6/2006 |
| WO | 2006085844 A1 | 8/2006 |
| WO | 2007009225 A1 | 1/2007 |
| WO | 2007115392 A1 | 10/2007 |

OTHER PUBLICATIONS

"Raceaudio to Provide Live In-Car-Audio Feeds to IMS Websites" 1998.
"Turner, NASCAR partner for Internet Rights", NASCAR News, Oct. 10, 2006.
HS1000 Portable FM Scanner, Instruction Manual, RELM Communications, Inc., Jun. 1996, pp. 1-19.
"40th Annual NASCAR Winston Cup Series Daytona 500", Exclusive Jeff Gordon In-Car Radio Transmission Live—Internet Site, Feb. 15, 1998.
Dutta-Roy, "Virtual Meetings with Desktop Conferencing", Jul. 1998, IEEE Spectrum, pp. 47-56.
Tedesco, "ESPN Extends NASCAR Deal", Jul. 20, 1998, Broadcasting & Cable, vol. 128, Issue 30, p. 61.
Uniden BC 120XLT Manual, 1994.
RadioShack PRO-74 Race Scanner Manual, 1998.
Schiedel, Motor Sports Now hear this! Drivers-crew conversations on the web, Providence Journal-Bulletin, Nov. 30, 1997.
Machlis, AlliedSignal races to the Web, Computerworld, Nov. 1997.
Abbott, "Viewers at Home, Advertisers Enjoying the Ride with NASCAR Racing is Zooming on Tv and Online—WIth a Winning Combination of Ratings and Demographics", Feb. 16, 1997, Orlando Sentinel, p.A. 20.
Sandridge et al.; Scanner questions purchase and strategy, Google Groups post, Feb. 1995.
Office action mailed Sep. 12, 2003, U.S. Appl. No. 10/060,800, filed Jan. 30, 2002.
Office action mailed May 26, 2004, U.S. Appl. No. 10/060,800, filed Jan. 30, 2002.
Advisory Action mailed Nov. 24, 2004, U.S. Appl. No. 10/060,800, filed Jan. 30, 2002.
Office action mailed Feb. 23, 2005, U.S. Appl. No. 10/060,800, filed Jan. 30, 2002.
Interview Summary mailed Oct. 18, 2005, U.S. Appl. No. 10/060,800, filed Jan. 30, 2002.
Office action mailed Dec. 30, 2005, U.S. Appl. No. 10/060,800, filed Jan. 30, 2002.
Notice of Allowance mailed Feb. 8, 2006, U.S. Appl. No. 10/060,800, Application filed Jan. 30, 2002.
Supplemental Notice of Allowance mailed Nov. 30, 2006, U.S. Appl. No. 10/060,800, filed Jan. 30, 2002.
Notice of Allowance mailed Nov. 3, 2006, U.S. Appl. No. 10/060,800, filed Jan. 30, 2002.
Office action mailed Jun. 16, 2010, U.S. Appl. No. 11/620,967, filed Jan. 8, 2007.
Final Office action mailed Jun. 16, 2010, U.S. Appl. No. 11/620,967, filed Jan. 8, 2007.
Notice of Allowance mailed May 23, 2011, U.S. Appl. No. 11/620,967, filed Jan. 8, 2007.
Notice of Allowance mailed Jan. 11, 2012, U.S. Appl. No. 11/620,967, filed Jan. 8, 2007.
Supplemental Notice of Allowance mailed Jan. 31, 2012, U.S. Appl. No. 11/620,967, filed Jan. 8, 2007.
Office action mailed Feb. 25, 2015, U.S. Appl. No. 13/400,245, filed Feb. 20, 2012.
Notice of Allowance mailed Mar. 31, 2015, U.S. Appl. No. 13/400,245, filed Feb. 20, 2012.
Corrected Notice of Allowance mailed Apr. 22, 2015, U.S. Appl. No. 13/400,245, filed Feb. 20, 2012.
Corrected Notice of Allowance mailed May 1, 2015, U.S. Appl. No. 13/400,245, filed Feb. 20, 2012.
ChoiceSeat(TM) Fact Sheet, Super Bowl XXXIII(TM), Pro Player Stadium, Miami, Florida, Jan. 31, 1999.
ChoiceSeat(TM) User Guide, New York Knicks, Madison Square Garden, Aug. 1999.
ChoiceSeat(TM) Flowchart, New York Rangers, Madison Square Garden, Rev. 3.2, Nov. 16, 1999.
McGraw et al., "Security Enhancements in JDK 1.1", Securing Java, Beyond the Sandbox: Signed Code and Java 2, Section 2, Jan. 1999, John Wiley & Sons, Inc.
ICOM IC-R3 Receiver, http://javiation.co.uk/ic-r3.html, Copyright © Javiation 2000-2004, Jul. 26, 2005, 2 pages.
Koyama, Takayoshi et al., ACM Press, International Conference on Computer Graphics and Interactive Techniques, Live 3D Video in Soccer Stadium, 2003, 2 pages.
Yan, Xin et al., ACM Press, International Multimedia Conference, 3D Reconstruction and Enrichment System for Broadcast Soccer Video, 2004, 3 pages.
Front Row Technologies, My Front Row(TM), Put the "Front Row" in the palm of your hand, http://www.myfrontrow.com/pages/439116/, Copyright 2001 by Mesa Digital LLC, 10 pages.
Cadence Embedded Systems Design Services Brings the Scanz Scannor to Market, http://www.edacafe.com/technical/papers/Cadence/vol4No4/scanz.php, 1999 Cadence Design Systems Inc.
Stadium fans touch the future—Internet Explorer and touch screens add interactivity to Super Bowl XXXII, 1998.
Grover, Armchair Baseball from the Web—or Your Stadium Seat, Business Week, Oct. 22, 1998.
Qualcomm Stadium, ChoiceSeat Network Diagram, May 11, 1998.
ChoiceSeat—Event Operations Manual for Madison Square Garden, 1999 Intel Corporation, Dec. 15, 1999.
ChoiceSeat screens, Jan. 1999.
ChoiceSeat—System Administrator's Binder for Madison Square Garden, Dec. 17, 1999.
Proposed ChoiceSeat Client Specification Summary, Initial Draft Mar. 29, 1997, Updated Sep. 30, 1997.
Proposed ChoiceSeat Network Specification Summary, Initial Draft, Aug. 25, 1997.
Proposed ChoiceSeat Network Specification Summary, Initial Draft Aug. 25, 1997 Updated Draft Aug. 28, 1997 Updated Draft Sep. 30, 1997.
ChoiceSeat Intellectual Property List, Aug. 28, 2001.
Vyvx, Doctor Design, and Erbes Dev. Group Go to the Ball Game: Watch PC-TV, Internet TV at the Stadium, http://ruel.net/top/box.article.05.htm, Sep. 1, 1997.
Williams Communications' ChoiceSeat™ demonstrates the interactive evolution of sports at Super Bowl™ XXXIII, www.williams.com/newsroom/news-releases/1999/rel287.htm, Tulsa, Jan. 20, 1999.

* cited by examiner

US 9,350,776 B2

SYSTEM AND METHOD FOR LISTENING TO TEAMS IN A RACE EVENT

CROSS-REFERENCE TO RELATED APPLICATION

This application is a continuation of application Ser. No. 13/400,245, filed Feb. 20, 2012, which is a continuation of application Ser. No. 11/620,967, filed Jan. 8, 2007, now U.S. Pat. No. 8,127,037, which is a continuation of application Ser. No. 10/060,800, filed Jan. 30, 2002, now U.S. Pat. No. 7,162,532, which is a continuation-in-part application and claims the priority of Ser. No. 09/128,896, filed Aug. 4, 1998, which claims the benefit of provisional patent application Ser. No. 60/075,659, filed Feb. 23, 1998, all of which are incorporated herein by reference.

BACKGROUND OF THE INVENTION

The present invention relates to race events. More particularly, the present invention allows a person to listen to communications of race teams participating in a race event where the person is remote from the race event.

Race events, such as motor vehicle racing, are a steadily growing sport. In many forms of racing, a driver communicates with a crew during the race to discuss strategy and vehicle performance. The communications are commonly listened to by fans at the race event, allowing the fans to become more involved during the race. However, the transmitters used are not powerful and are generally limited in range so as to function within the area of the race track. Thus, only those fans at the race have the ability to listen to the race communications. For fans watching the race remotely, such as on television, the communications are not generally available except for occasional excerpts provided by the race broadcaster.

SUMMARY OF THE INVENTION

A computer-implemented method and system allows a remote computer user to listen to teams in a race event. The method includes receiving audio signals from a plurality of audio sources at the race event; transmitting at least some of the audio signals to a remote computer; and filtering the audio signals as a function of the source of at least some of the audio signals so that at least some of the audio signals are not played by the remote computer and heard by the user.

BRIEF DESCRIPTION OF THE DRAWINGS

FIG. 2 is a user interface for selecting which race communications to listen to.

DETAILED DESCRIPTION OF THE PREFERRED EMBODIMENTS

Figure 1:
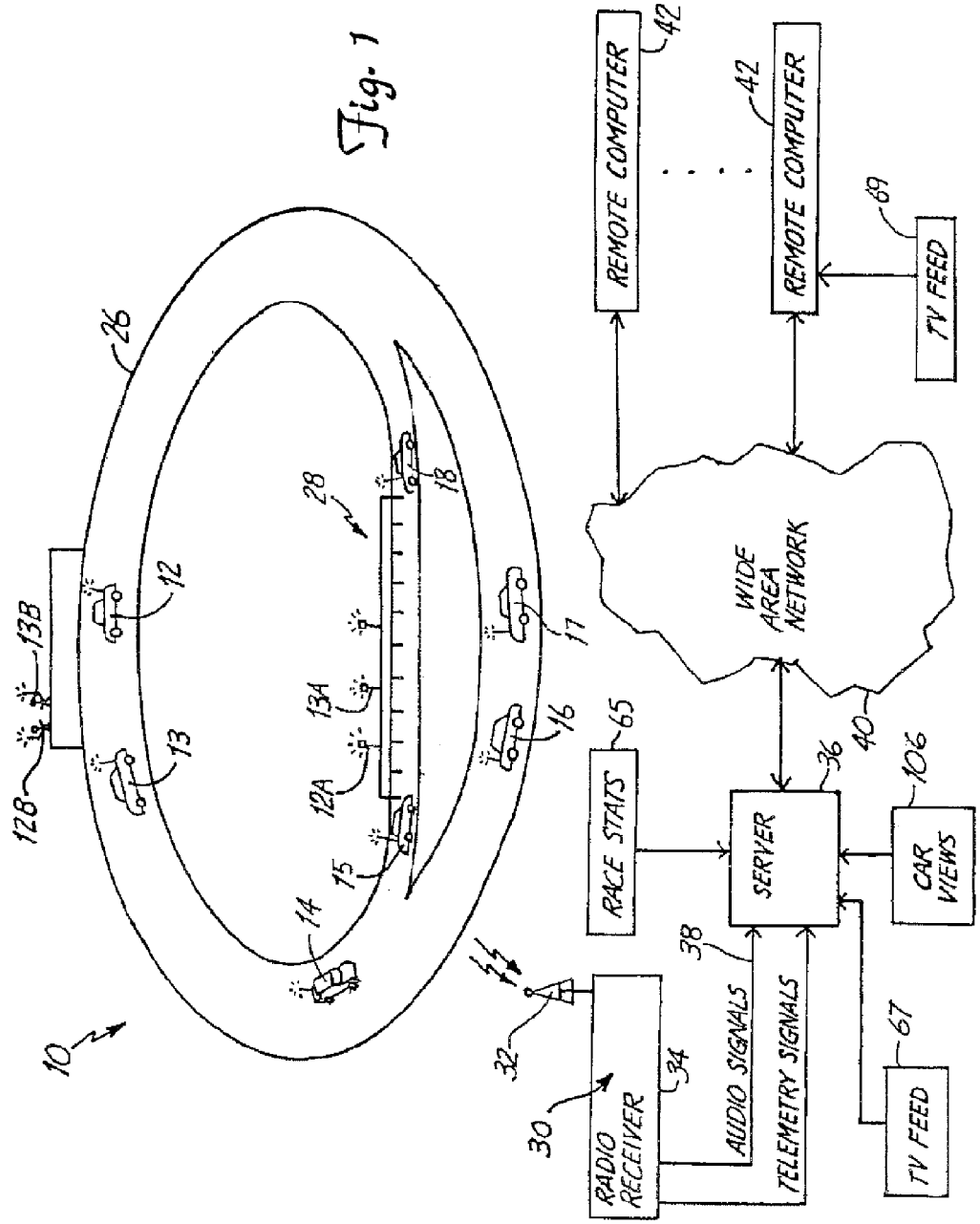
FIG. 1 is a pictorial representation of a race event and a system of the present invention for monitoring race communications and providing the communications to a remote fan.

A race event is illustrated in FIG. 1 at 10. In the embodiment illustrated, the race event 10 is a motor vehicle race involving a plurality of cars at 12, 13, 14, 15, 16, 17 and 18. The cars race on an oval track 26. The track includes a pit area 28 used for periodic refueling and maintenance of the cars 12-18 during the race.

During the race, the driver of each of the cars 12-18 are in communication with team members located in the pit area 28. The drivers of the cars 12-18 discuss race strategy including when to perform refueling and maintenance on the car during the race. Generally, each team is assigned a particular channel or operating frequency to the exclusion of all other teams so that the driver and the team can communicate easily. In the embodiment illustrated, the driver of car 12 communicates with a team member located in the pit area 28, designated at 12A, while the driver of car 13 communicates with a team member 13A, also in the pit area 28.

In many race events, additional team members may be located at other areas on the track 26 during the race. For instance, a "spotter" 12B is also sometimes present during the race. The spotter 12B watches the race and communicates with the driver of car 12 and the team member 12A located in the pit area 28, providing relevant information concerning the race. For example, the spotter 12B informs the driver of car 12 when he has cleared another car during the race and can safely pass in front the other car. Likewise, a spotter 13B communicates with the driver of car 13 and the team member 13A in the pit area 28 similarly. As stated above, each of the teams for the cars 12-18 have team members in the pit area 28 and spotters communicating on separate assigned channels.

FIG. 1 further illustrates a system 30 of the present invention that allows a remote fan to selectively listen to communications made by the team members of each team during the race. The system 30 includes an antenna 32 for picking up all communications made between the team members of each team during the race. A radio receiver 34 is connected to the antenna 32 and provides the communications to a computer 36 as audio signals 38. The computer 36 is located at the race track 26 or remote therefrom. However, whether located at the track 26 or remote therefrom, the computer 36 is connected to a wide area network 40, such as the Internet. A remote race fan uses a remote computer 42 connectable to the wide area network 40, and accesses the computer 36 (hereinafter "server") in order to receive information from the server 36 indicative of the audio signals 38 and, thus, the communications of the race event 10.

The server 36 and the remote computer 42 can be a personal computer, laptop computer or other suitable computing device connectable to the wide area network 40 using phone lines, cable lines, satellite links, or other suitable communication means. Generally, the remote computer 42 includes a display or monitor, an input device, such as a keyboard or a mouse, and speaker, not shown, but well known. The remote computer 42 further includes a suitable microprocessor and support peripherals such as random access memory (RAM), read only memory (ROM) and storage mediums such as a hard disk, floppy disk/drive and/or optical disk/drive communicating with each other over a system bus, again all well known in the art. Exemplary embodiments of the present invention described below include modules that can be implemented in hardware, software or a combination of both hardware and software.

Figure 2:
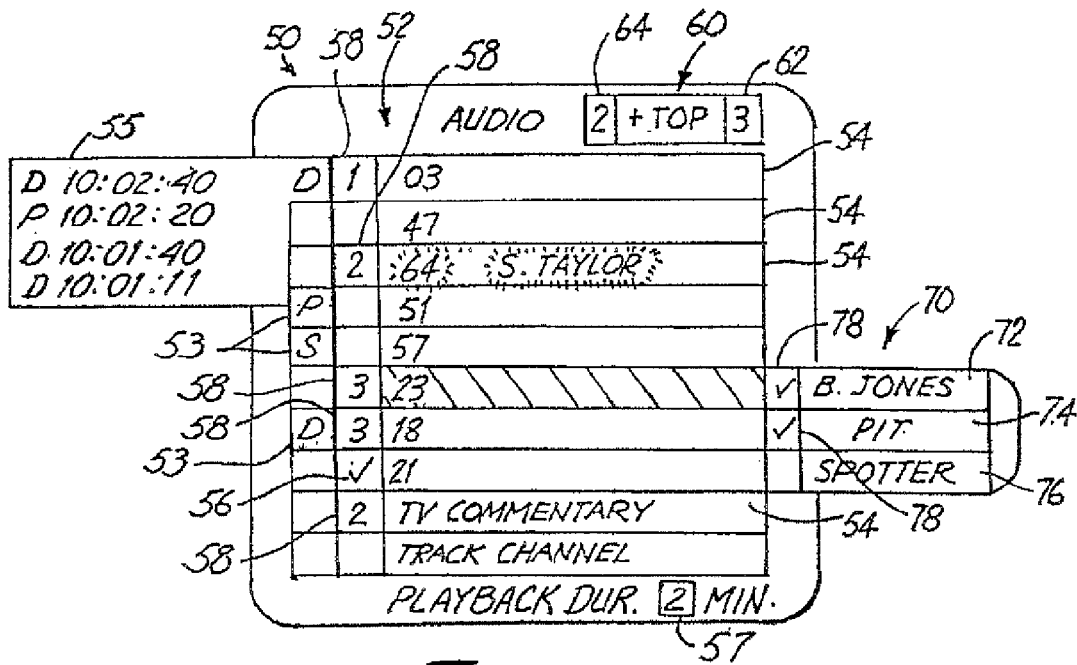

In a preferred embodiment of the present invention, the remote fan using the remote computer 42 can select any or all of the team communications to listen to during the race. FIG. 2 is an embodiment of a user interface 50 displayable on the monitor of the remote computer 42. The user interface comprises a list 52 of each of the participants in the race. The list 52 includes unique identifiers 54, such as the car number or the team name, for each of the race participants. Using a suitable input device, such as a mouse, the remote fan selects any or all of the participants to listen to during the race using the unique identifiers 54.

In a first embodiment, selection of a race participant to listen to can be identified by a "check" indicated at 56 for the corresponding identifier 54. During the race, the communications pertaining to only those selected teams in the list 52 would be provided to the speaker of the remote computer 42 for listening by the remote fan. Communications of teams not selected in the list 52 would be filtered by either the server 36 or the remote computer 42 (if all of the communications are passed through the wide area network 40), and not provided to the speaker of the remote computer 42. In this manner, the remote fan can choose which participants to listen to during the race, while ignoring or filtering out all other communications. In a further embodiment, when there exists any communication between the driver, the pit area or the spotter, if present, of a selected participant in the list 52, the unique identifier 54 corresponding to the communication is uniquely identified in the list 52 so as to signify to the remote fan which team is currently being heard through the speaker of the remote computer 42. For instance, the unique identifier 54 can flash (as illustrated for team number 64), be presented in bold face or highlighted when communications are being heard over the speaker of the remote computer 42. As stated above, typically each team is assigned a unique channel or frequency, thus, identification of each communication is relatively easy.

In a further embodiment, the remote fan can prioritize the selected teams in the list 52. In the embodiment illustrated, a priority number is indicated at 58 for each of the teams selected. The highest priority team is herein indicated as "1", while the lowest priority team is indicated as "3". By prioritizing, the remote fan can be assured of hearing substantially all communications from a particular team, while still being able to hear most of the communications from other teams. For instance, if communications are currently being heard from a priority "2" team through the speaker of the remote computer 42 and communication starts for a priority "1" team, the audio being played over the speaker of the remote computer 42 will immediately switch to the priority "1" team. Likewise, if a priority "3" team communication is currently being heard and a priority "2" team communication begins, the speaker of the remote computer 42 will then start providing the priority "2" team communication. However, if during the playing of a communication, a lower priority communication begins, the lower priority communication will not be delivered by the speaker of the remote computer 42 until the communication of the higher priority communications suspends, which is typically signified by silence for a given time period. In addition, if during the communication of a priority team, another communication of a team having the same priority begins, the communication of the first playing team will not suspend until the communication is over. At that time, the communication of the other team having the same priority will then begin.

In a further embodiment, the list 52 can include other audio sources such as TV commentary provided by a broadcaster televising the race event 10. The list 52 can also include race or track officials broadcasting on a radio frequency at the race event 10, which is typically only heard by fans or participants at the race event 10. Like the teams in the list 52, the TV commentary and track channel can also be selected and/or prioritized in the manner described above.

The TV commentary can be provided to the server 36 as indicated at 67 or to the remote computer 42 as indicated at 69, wherein the TV feed is separately provided to the remote computer 42 or the TV feed and the signals from the wide area network are provided to a single assembly such as a settop box. Communications pertaining to the track channel can be received by the antenna 32 or otherwise provided directly to the server 36.

In another further embodiment, the remote fan can also select to hear the race leading participants regardless of whether or not they have been selected in the list 52. A selection field is indicated in the user interface 50 at 60. The selection field 60 includes a user selectable number of leading participants to listen to at 62. The selectable number 62 is adjustable from zero to any desired number of participants. A priority field 64 can also be provided and functions similar to the priority indicators described above. Thus, in the embodiment illustrated, if there exists a communication from one of the first three race leaders, and that team was not otherwise selected from the list 52, the communication will be played over the speaker of the remote computer 42 and the unique identifier 54 will be highlighted or otherwise identified to the remote fan in the list 52.

Current race statistics identifying the position of each of the race positions of the cars 12-18 can be provided as an input to the server 36, as indicated at 65. Based on the race statistics, the server 36 or the remote computer 42 can determine if a communication from a particular team meets the criteria of field 60.

In yet a further embodiment, the user interface 50 allows the remote fan to choose which team members of each team to listen to if a communication exists. In the embodiment illustrated, upon selection of the unique identifier 54 for a particular participating team, a list 70 listing the team members communicating on a team channel is provided. Typically, the team members include a driver 72, a team member 74 located in the pit area 28 and one or more spotters 76 also communicating on the team channel. The list also includes corresponding selectable portions 78 for each of the team members 72, 74 and 76 communicating on the team channel. By using an input device, such as a mouse, the remote fan can select which team members 72, 74 and 76 of each team to listen to while filtering out communications of unwanted team members from that team. This feature is particularly useful at some race events where communications from spotters occur frequently; however, the information may not be particularly interesting to the race fan. By allowing the remote fan to select those communications of each team that he is interested in and filter out communications from other team members, audio heard from the race event 10 can be more enjoyable.

In the embodiment illustrated, the unique identifier 54 corresponds to the team member in the list 70 when that communication is being heard over the speaker of the remote computer 42. Thus, when the driver is being heard over the speaker, his/her name will appear flashing, highlighted or in bold in the list 52 as illustrated with respect to car number 64. Likewise, when the team member in the pit area is being heard, a suitable designation such as "PIT" will appear in conjunction with the car number.

In a further embodiment, some or all team communications can be stored for later playing. For instance, as explained above, priorities can be set so that some team communications will be heard over others. In the event, overlap exists in the communications such that one team is not heard because another team communication is being heard, the former communication audio signals can be stored (either at the server or at the remote listener's computer, discussed below) so that the listener can hear the communication at a later time. Any overlapping communications can be stored in this manner.

If desired, list 52 can include an identifier 53 that indicates a stored communication of the corresponding team. The identifier 53 can also indicate the team member speaking, for example, "D" for driver, "P" for pit, etc. In FIG. 2, a table 55 can be accessed indicating all of the stored communications for that team. The listener can then indicate which communication to play from the table 55. The indications in the table 55 can also include a time stamp or other signifier (e.g. a lap identifier for that team or referenced to the race leader) to give the listener information as to when the communication was made. The listener can individually play each desired communication, or alternatively, playback can begin with that communication and continue with other communications from other members of that team within a selected duration (from the first identified communication or from last played communication), which can be adjusted if desired at 57.

In one mode of operation, the stored communication can be played automatically when there are currently no other selected teams communicating. In another mode of operation, the listener can indicate playing when the listener desires, for instance, by activating the identifier through an input device such as a mouse. If during playback, a higher priority communication is received, the higher priority communication can be played immediately or stored automatically for later playback.

Figure 3:
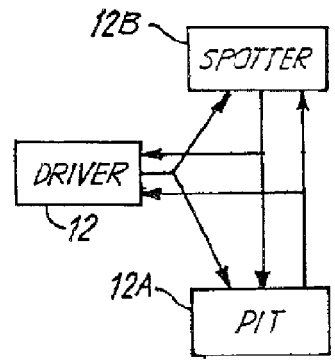
FIG. 3 is a schematic diagram illustrating a channel of communication for one team.

FIG. 3 illustrates communication between the team members of the team comprising car 12, the team member 12A in the pit area 28 and the spotter 12B. As stated above, the communications of these team members is herein considered a channel. To identify each of the team members in order to allow filtering using the list 70, suitable analog or digital identifiers are associated with the communications from each of the team members. For instance, if the team members communicate over a digital channel, a unique digital tag can be associated with the driver of car 12, the team member 12A in the pit area 28 and the spotter 12B. Based on the digital tag, the communication from that team member is played over the speaker of the remote computer 42 if that particular member has been selected in the list 70 of that team. In another embodiment, each of the team members can transmit on their own unique carrier frequency, but be able to receive communications from the other team members which are also transmitting on unique frequencies. In this manner, if a communication exists on a frequency corresponding to a team member selected in the list 70, that communication would be heard over the speaker of the remote computer 42. In this embodiment, although unique frequencies have been assigned to each of the team members, that set of unique frequencies is considered a team channel.

Figure 4:
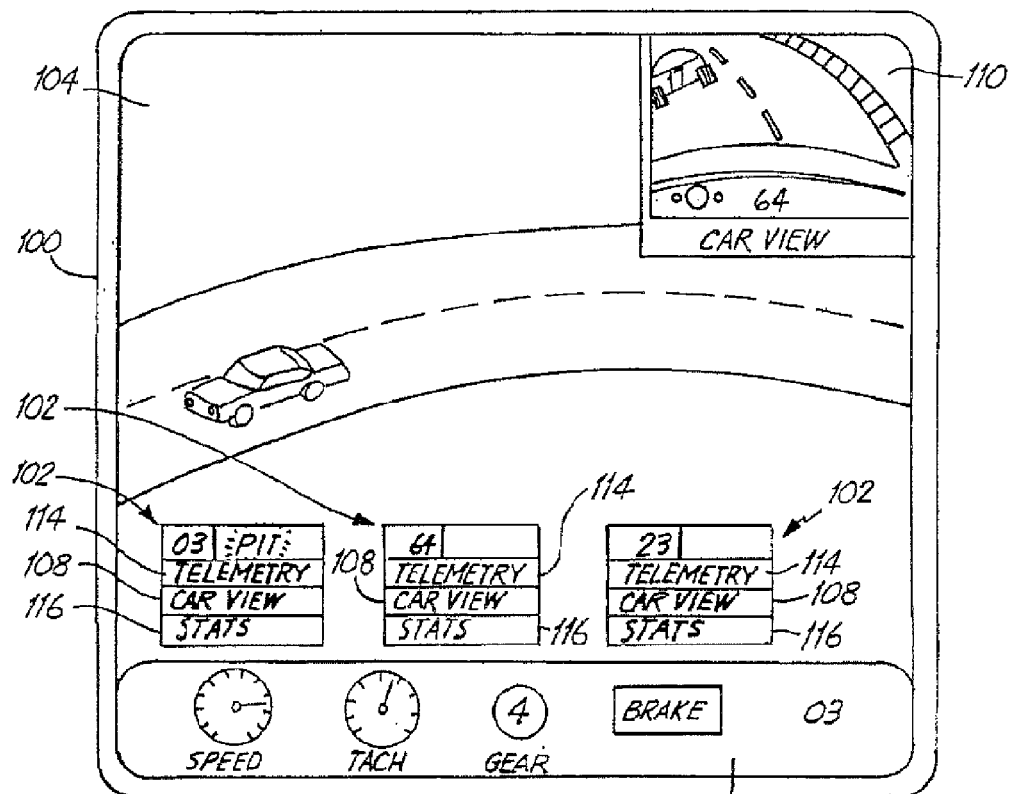
FIG. 4 is a monitor illustrating a form of user interfaces for remotely viewing and listening to a race.

FIGS. 1 and 4 illustrate other information that can be transmitted to a remote fan using the system of the present invention. FIG. 4 is a display or monitor 100 at the remote computer 42. During the race, the monitor 100 displays identifiers 102 for each of the participants, for example, those selected in the list 52. The identifiers 102 can be continuously provided on the display 100 or selected and displayed at the control of the remote fan. A major portion 104 of the monitor 100 can show the picture currently being received from the television broadcaster. As stated above, this signal can be provided to the server 36 as indicated at 67 or to the remote computer 42 as indicated at 69. In addition to the television broadcaster's view of the race event 10, one or more of the race cars 12-18 can be equipped with cameras as is commonly known in the art. Each of the signals from the cameras in the race cars 12-18 can be provided to the server 36 as indicated at 106. With the views of each of the cars 12-18 provided to the server 36, the remote fan can select one or more views from the car views 106 as he desires with the remote computer 42. In the embodiment illustrated, a portion 108 of each identifier 102 is identified as a "car view" for that particular car and is used to select the car view for display on the monitor 100. The selected car view then can be displayed in a portion 110 of the monitor 100 in conjunction with the view provided by the television broadcaster. If desired, the car view can be expanded to cover all of the monitor 100. In another embodiment, each of the car views can be provided in a list, similar to the list 52 illustrated in FIG. 2, and selected when desired by the remote fan.

In a further embodiment, the server 36 receives telemetry signals from each of the cars 12-18 indicating, for example, the speed of the car, the engine speed of the car, the current gear and when brakes are applied. This information is provided to the remote computer 42 and displayed on the monitor 100 such as indicated at 112. In the embodiment illustrated, the telemetry signals are received by the radio receiver 34. The remote fan selects which telemetry signals to display. In the embodiment illustrated, a portion 114 is provided for each of the identifiers 102 to select the corresponding telemetry signals of each car. If desired, a list similar to the list 52 described above, can be separately provided for the selection of telemetry signals.

In a further embodiment, team statistics can be separately selected and displayed when desired. In the embodiment illustrated, the statistics are selected through a portion 116 of each of the identifiers 102. The team statistics can include, for example, the participant's current position in the race, the top speed obtained during the race, the average speed during the race, the average speed for the last five laps, the pit times during the race and the average time in seconds behind the leader. These unique statistics for each of the teams are displayed on the monitor 100 when selected by the user using the remote computer 42. Each of the team statistics are provided to the server 36 as indicated at 65 and updated as necessary during the race.

Figure 5:
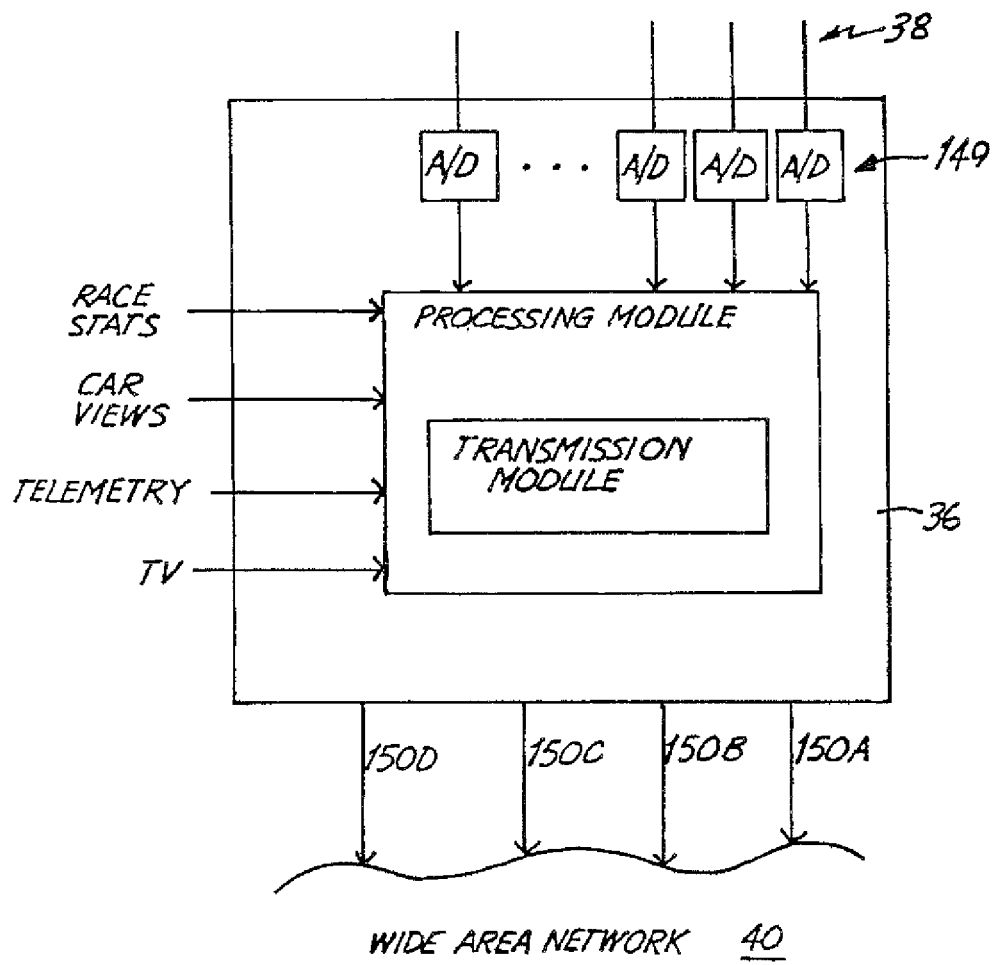
FIG. 5 is a block diagram of a server.

FIG. 5 illustrates an exemplary server 36 for transmission of race information, discussed above, through the wide area network 40 to the remote computers 42. The server 36 includes a processing module 120 that receives any or all of the audio signals 38 and stores the signals if necessary, the telemetry signals, the race statistics 65, the car views 106 and the television feed 67. The processing module 120 processes the information for transmission to the remote computers 42, which typically includes digitizing the signals and forming the digitized data into data packets that are sent through the wide area network 40 to the remote computers 42 through a transmission module 122. The use of transmitted data packets, which can be sent individually, or grouped as files, to provide substantially continuous viewing and/or listening from a remote location over the Internet is well known. One manufacturer using such technology includes RealNetworks, Inc. of Seattle, Wash., which produce REALAUDIO and REALVIDEO. These systems allow a user of a remote computer to select a particular "audio station" or "video station" from a server across the Internet. A data stream is then transmitted to the user whereat a receiving module provided on the user's computer converts the data stream for display through the monitor and/or output through the speaker.

Figure 6:
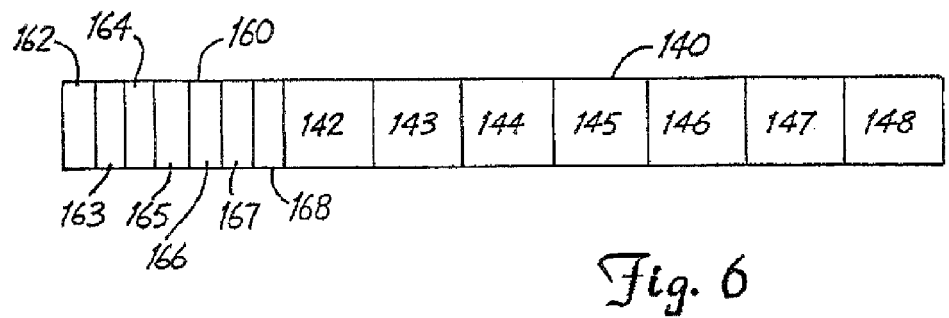
FIG. 6 is a representative view of a data packet.

In one embodiment of the present invention, the processing module 120 processes the information into data packets that include information for at least two different audio, video or telemetry signals for different teams. Referring to FIG. 6, an exemplary data packet 140 for audio signals is illustrated. It should be understood that the embodiment shown is for illustrative purposes only and that other data packets having alternative structures can be used in the present invention.

The data packet 140 includes portions 142, 143, 144, 145, 146, 147 and 148 corresponding to each of the team channels for the cars 12-18, respectively. In particular, the values contained in portions 142-148 are indicative of communication between the team members for each respective team. In the embodiment illustrated, analog-to-digital converters 149 are provided to convert the audio signals 38 to digital values, which are provided to the processing module 120. Of course, if the audio signals are digital, the analog-to-digital converters are not required. The processing module 120 receives the digital values and forms data packets 140 that are transmitted to the remote computer through the wide area network 40. In the exemplary embodiment, the length of the data packet 140 is a function of the number of team channels present. Typically, the length of the data packet 140 will be limited by the throughput of the connections forming the wide area network 40. In some situations, it may be necessary to form the different data packets for different sets of teams. The remote computer user would then select which stream of data packets to receive. This is represented in FIG. 5 as data lines 150A, 150B, 150C and 150D. For example, data packets for data line 150A can be for a first set of five preselected team channels, whereas data packets for data lines 150B and 150C can be for a second and third set of preselected team channels. In contrast, data packets for data line 150D can be for team channels dynamically selected. For example, the team channels present in data line 150D can be the top five cars leading the race, wherein the processing module 120 forms the data packets for data line 150D from the race statistics 65. Alternatively, the team channels present in data line 150D can be chosen based on other criteria including requests made by the remote computers 42.

In a further embodiment, the data packet 140 includes a portion 160 having subportions 162, 163, 164, 165, 166, 167 and 168 corresponding to each of the portions 142-148. In particular, the values present in subportions 162-168 are used to identify the particular team member of each team that is talking during the instant of time that the data packet 140 represents. As explained above, a race team can include a driver, a pit member and a spotter. The unique value is associated with each of these members and used in the portions 162-168 to identify the team member that is talking. In effect, the portions 162-168 comprise identifiers or tags for each of the portions 142-148. In one exemplary embodiment, one or two bytes can be used for each of the portions 142-148, whereas one or two bytes can be used for the portion 150 wherein two bits are associated with each portion 162-168.

In the data packet 140 described above, each team is identified by its position in the data packet. It should be understood that further information can be transmitted to the remote computer 42 so that the remote computer 42 can properly determine which teams comprise the data packet. Even in the case of data line 150D, the server 36 can transmit information to the remote computers 42 indicating which teams currently comprise the corresponding data packets. In this manner, unique identifiers need not be associated with each team or team member as data is transmitted, which reduces the amount of data transmitted. However, in an alternative embodiment of the present invention, identifiers can be associated with each data packet identifying which teams and/or team members are associated with each corresponding data packet. This allows the data packet to only contain teams currently communicating at any given instant. Accordingly, the data packets can be of varying length. Although described above with respect to team audio signals, it should be understood other audio signals such as the television feed 67 can be included. In addition, similar data packets can be formed for video and telemetry information, or alternatively, integrated into the data packet with the audio signals. Compression techniques can be used to minimize the length of the data packet, if desired.

In yet a further alternative embodiment, each data packet can be for only one team channel or team member. Identifiers can be included to identify which team or team member the data packet is associated with. If desired, any of the above-described data packets can be transmitted using multiplex transmission communication techniques incorporating, but not limited to, time division, frequency division or phase division.

Figure 7:
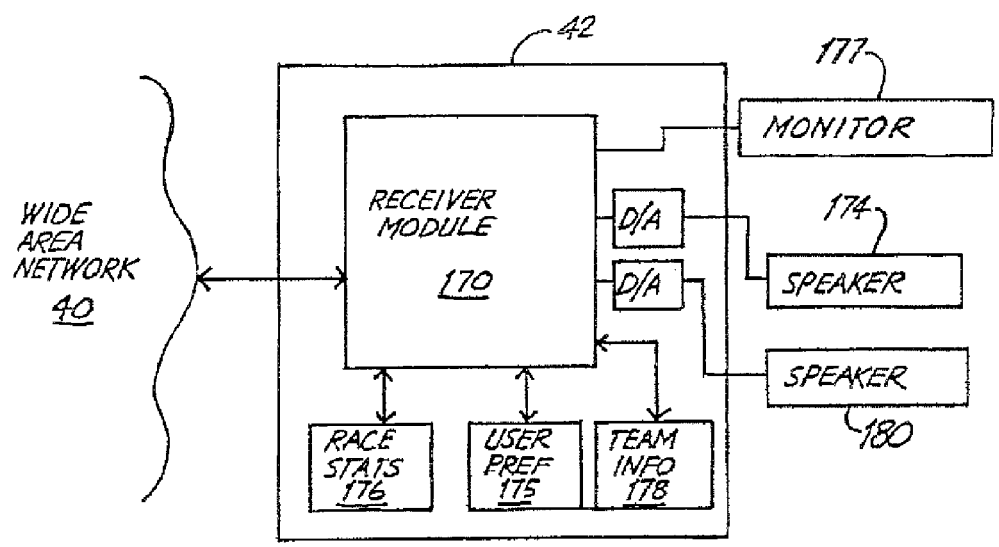
FIG. 7 is a block diagram of remote computer.

Referring to FIG. 7, the remote computer 42 includes a receiver module 170. The receiver module 170 receives the data packets and processes the information contained therein. The receiver module 170 receives the data packets according to any of the transmission techniques described above. In one embodiment, the receiver module 170 functions as a filter and only allows those teams that have been selected (check 56) to be heard over a speaker 174. The selections can be stored at 175. In a further embodiment, the selections 175 can include priority and team member selections. The receiver module 170 processes each data packet according to the assigned priority and team members to be heard, as discussed above. The signals can be stored for later playback when desired.

Race statistics 65 are periodically transmitted from the server 36 to the remote computer 42 and stored at 176. The race statistics 176 are accessed by the user for display on a monitor 177 as desired and used to assign priority in accordance with values selected at 62 and 64 in FIG. 2.

In another embodiment, at least some of the filtering is performed by the server 36. For example, data line 150D represents transmission of audio signals for a selected number of teams leading the race. Thus, although the server 36 receives all communications from the receiver 32, only those communications pertaining to the selected number of leading teams are transmitted to the receiver module 170. In this embodiment, the receiver module 170 can pass all communications to the speaker 174, or, if desired, further filter the communications pursuant to stored preferences.

In one preferred method of operation, the receiver module 170 can be used for a plurality of race events. In particular, information regarding each of the teams for use in the user interface 50 and display of FIG. 4 is provided to the remote computer 42 over the wide area network 40, for example, from the server 36 or another remote computer, and stored at 178. The remote computer user then selects those audio channels of interest, assigning priority levels and choosing which team members will be heard, if desired. Data packets and race statistics are received periodically. As data packets are received and processed, the user interface 50 or display of FIG. 4 is updated to indicate which audio channel and/or team member is being heard over the speaker 174.

If desired, more than one speaker 174 can be used for playing audio signals. FIG. 7 illustrates a second speaker 180. In one embodiment, the speaker 180 is used for playing audio signals from a first set of one or more teams, while the speaker 174 is used for playing audio signals from a second set of one or more teams. Upon receipt of the data representative of the audio signals, the receiver module 170 filters the signals to each of the speakers 174 and 180. In another embodiment, the speakers 174 and 180 can be used when assigned priority values would cutoff an audio signal being played through the speakers. For instance, if communications are currently being heard from a priority "2" team through the speaker 174 of the remote computer 42 and communication starts for a priority "1" team, the audio being played over the speaker 174 can continue, while the communication from the priority "1" team will be played over the speaker 180. Although described with respect to the use of two speakers, it should be understood that three, four or more speaker systems can be used similarly.

Although the present invention has been described with reference to preferred embodiments, workers skilled in the art will recognize that changes may be made in form and detail without departing from the spirit and scope of the invention.

What is claimed is:

1. A computer implemented method to provide audio and video from a televised vehicle race event using a computer network to a plurality of remote computing devices remote from the vehicle race event, the computer implemented method comprising:
providing a server having a processor operable to enable the server to communicate via the computer network to each of the remote computing devices and to access a storage device having audio data from the televised vehicle race event;
providing a user interface for a single monitor operable on each of the plurality of remote computing devices, the user interface configured to render a visual indication identifying audio sources of a first plurality of audio sources apart from other audio sources that have audio that can be rendered at each of the plurality of remote computing devices, wherein a number of audio sources in the first plurality of audio sources is less than a total number of audio sources at the vehicle race event having audio that can be rendered at each of the plurality of remote computing devices;
during the televised vehicle race event and separate from a television signal of the televised vehicle race event:
transmitting with the server to each of the remote computing devices through the computer network, first data packets in one or more streams containing first data representing audio signals from audio sources and video signals from cameras at the vehicle race event, the first data packets constructed so that each remote computing device selectively renders a plurality of camera views occurring at the same time in the televised vehicle race simultaneously with audio from only one of the audio sources of the first plurality of audio sources when audio from at least two of the audio sources of the first plurality of audio sources occurs at the same time;
after transmitting from the server to each remote computing device the first data packets constructed so that each remote computing device renders the plurality of camera views occurring at the same time in the vehicle race event simultaneously with audio from only one of the audio sources of the first plurality of audio sources when audio from at least two of the audio sources of the first plurality of audio sources occurs at the same time, receiving with the server from at least one remote computing device to transmit audio of an audio source that occurred earlier in the vehicle race event; and
after receiving the indication from the at least one remote computing device, transmitting with the server to the at least one remote computing device, second data packets containing second data representing the audio corresponding to the indication from the at least one remote computing device.

2. The computer implemented method of claim 1 wherein the user interface is configured to render a second visual indication apart from the first visual indication, the second visual indication indicating audio sources of a second plurality of audio sources having audio that can be rendered at each of the plurality of remote computing devices, wherein a number of audio sources in the second plurality of audio sources is less than the total number of audio sources at the vehicle race event having audio that can be rendered at each of the plurality of remote computing devices, and wherein the computer implemented method further comprises transmitting, from the server to each remote computing device through the computer network, the first data packets or third data packets, or combinations thereof containing third data representing audio signals from audio sources and video signals from cameras at the vehicle race event constructed so that each remote computing device selectively renders a different plurality of camera views occurring at the same time in the vehicle race simultaneously with audio from only one of the audio sources of the second plurality of audio sources when audio from at least two of the audio sources of the second plurality of audio sources occurs at the same time.

3. The computer implemented method of claim 2 wherein receiving at the server the indication from the at least one remote computing device comprises receiving at the server an indication from each of the remote computing devices to transmit audio of one of the audio sources that occurred earlier in the vehicle race event, and wherein transmitting from the server to the at least one remote computing device comprises transmitting from the server to each of the remote computing devices, second data packets for each respective remote computing device containing data representing the audio corresponding to each indication from each respective remote computing device.

4. The computer implemented method of claim 3 wherein at least two of the audio sources of the first plurality of audio sources are associated with two different teams in the vehicle race event.

5. The computer implemented method of claim 4 wherein at least two of the audio sources of the second plurality of audio sources are associated with two different teams in the vehicle race event, the at least two audio sources of the second plurality of audio sources being different than the at least two audio sources of the first plurality of audio sources.

6. A computing system to provide audio and video associated with teams during a televised vehicle race event via a computer network to a plurality of remote computing devices remote from the vehicle race event, the computing system comprising:
a storage device configured to store data of audio from each of a plurality of audio sources from the vehicle race event; and
a server having a processing module operably connected to the storage device to receive the data and to the computer network, the processing module configured to during the televised vehicle race event and separate from a television signal of the televised vehicle race event:
transmit to each remote computing device through the computer network first data packets in one or more streams containing first data representing the audio signals from the audio sources and the video signals from the cameras at the vehicle race event, the first data packets constructed so that each remote computing device selectively renders a plurality of camera views occurring at the same time in the vehicle race event simultaneously with audio from one of the audio sources of a first plurality of audio sources having audio that can be rendered at each of the plurality of remote computing devices when audio from at least two of the audio sources of the first plurality of audio sources occurs at the same time, wherein a number of audio sources in the first plurality of audio sources is less than a total number of audio sources at the vehicle race event having audio that can be rendered at each of the plurality of remote computing devices;

after transmitting to each of the remote computing devices the first data packets constructed so that each remote computing device selectively renders the plurality of camera views occurring at the same time in the race simultaneously with audio from one of the audio sources of the first plurality of audio sources when audio from at least two of the audio sources of the first plurality of audio sources occurs at the same time, receive an indication from at least one remote computing device to transmit audio of an audio source that occurred earlier in the vehicle race event; and after receiving the indication from the at least one remote computing device, access the storage device and transmit to the at least one remote computing device, second data packets containing second data representing the audio corresponding to the indication from the at least one remote computing device.

7. The computing device of claim 6 wherein the processing module is further configured to transmit to each remote computing device through the computer network, the first data packets, or third data packets or combinations thereof containing third data representing audio signals from audio sources and video signals from cameras at the vehicle race event constructed so that each remote computing device selectively renders a different plurality of camera views occurring at the same time in the vehicle race simultaneously with audio from one of the audio sources of a second plurality of audio sources when audio from at least two of the audio sources of the second plurality of audio sources occurs at the same time, wherein a number of audio sources in the second plurality of audio sources having audio that can be rendered at each of the plurality of remote computing devices is less than the total number of audio sources at the vehicle race event having audio that can be rendered at each of the plurality of remote computing devices.

8. The computing device of claim 6 wherein the processing module is further configured to receive a second indication from each of the remote computing devices to transmit audio of one of the audio sources that occurred earlier in the vehicle race event, and configured to transmit to each of the remote computing devices, second data packets for each respective remote computing device containing data representing the audio corresponding to each second indication from each respective remote computing device.

9. A computing device for rendering audio and video of a vehicle race event, the computing device comprising:
   a speaker;
   a single monitor;
   a user interface; and
   a processor operably coupled to the speaker, the single monitor and the user interface, the processor configured to:
      receive from a network data packets representative of audio from audio sources and video from cameras at the vehicle race event;
      visually identify on the single monitor audio sources of a first plurality of audio sources at the vehicle race event having audio that can be rendered through the speaker, a number of audio sources in the first plurality of audio sources being less than a total number of audio sources at the vehicle race event having audio that can be rendered through the speaker;
      at least during portions of the vehicle race event as the vehicle race event is occurring live:
         receive through the user interface an indication of a selected audio source that the user of the computing device wants to hear over any other audio source at the vehicle race event;
         audibly render through the speaker the selected audio source that the user of the computing device wants to hear over any other audio source at the vehicle race event;
         receive through the user interface inputs from a user of the computing device to selectively render on the single monitor only one of any of the camera views and to selectively render on the single monitor a plurality of camera views of the vehicle race event occurring at the same time during the vehicle race event;
         simultaneously visually render the plurality of camera views of the vehicle race event on the single monitor occurring at the same time during the vehicle race event while also audibly rendering through the speaker only one audio source of the first plurality of audio sources when audio occurs simultaneously during the vehicle race event for at least two audio sources of the first plurality of audio sources;
         after audibly rendering the only one audio source of the first plurality of audio sources or the audio of the selected audio source that the user of the computing device wants to hear over any other audio source at the vehicle race event, receive through the user interface a second indication of an audio source having audio that occurred earlier in the vehicle race event; and
         audibly render through the speaker audio corresponding to the second indication that occurred earlier in the vehicle race event.

10. The computing device of claim 9 wherein the only one audio source of the first plurality of audio sources is audio associated with a team, and wherein the plurality of camera views are views from cameras in separate vehicles of teams other than said team.

11. The computing device of claim 9 wherein the data packets representative of audio from the audio sources and video from the cameras at the vehicle race event are separate from a television signal of the vehicle race event.

12. The computing device of claim 9 wherein the processor is further configured to visually identify on the single monitor other audio sources having audio that can be rendered through the speaker that are different than the audio sources of the first plurality of audio sources.

13. The computing device of claim 12 wherein the other audio sources that are different than the audio sources of the first plurality of audio sources comprise audio sources of a second plurality of audio sources having audio that can be rendered through the speaker, a number of audio sources in the second plurality of audio sources being less than the total number of audio sources at the vehicle race event having audio that can be rendered at the computing device.

14. The computing device of claim 13 wherein the processor is further configured to visually identify on the single monitor the audio sources of the first plurality of audio sources apart from the audio sources of the second plurality of audio sources.

15. The computing device of claim 14 wherein the processor is further configured to simultaneously visually identify on the single monitor with a first visual indication the audio sources of the first plurality of audio sources and with a second visual indication the audio sources of the second plurality of audio sources.

16. The computing device of claim 9 wherein the plurality of camera views of the vehicle race event occurring at the same time comprises a view of the vehicle race event as seen by a camera in a vehicle and a view of the vehicle race event as seen by a camera not in a vehicle.

17. The computing device of claim 9 and wherein the processor is further configured to visually render on the single monitor an indication of time when the audio corresponding to the second indication occurred during the vehicle race event.

18. The computing device of claim 9 and wherein the processor is further configured to visually render performance of a team relative to a leader of the vehicle race event.

19. The computing device of claim 9 and wherein the processor is further configured to receive through the user interface a third indication to enlarge one of the camera views of the vehicle race event as seen by a vehicle in the vehicle race event to be the only camera view on the single monitor and then visually render said one of the camera views as the only camera view on the single monitor.

20. The computing device of claim 19 and wherein the processor is further configured to:
    render a first visual indication on the single monitor indicating audio sources of the first plurality of audio sources and a second visual indication apart from the first visual indication, the second visual indication indicating audio sources of a second plurality of audio sources, different than the first plurality of audio sources, having audio that can be rendered;
    receive through the user interface a fourth indication to render a different plurality of camera views occurring at the same time in the vehicle race; and
    render the different plurality of camera views occurring at the same time in the vehicle race simultaneously with audio from only one of the audio sources of the second plurality of audio sources when audio from at least two of the audio sources of the second plurality of audio sources occurs at the same time.

* * * * *